(12) United States Patent
Morton et al.

(10) Patent No.: US 9,633,076 B1
(45) Date of Patent: Apr. 25, 2017

(54) BLENDING AND VISUALIZING DATA FROM MULTIPLE DATA SOURCES

(71) Applicant: Tableau Software Inc., Seattle, WA (US)

(72) Inventors: Robert Morton, Seattle, WA (US); Ross Bunker, Seattle, WA (US); Marianne Shaw, Seattle, WA (US); Pawel Terlecki, Seattle, WA (US)

(73) Assignee: TABLEAU SOFTWARE INC., Seattle, WA (US)

( * ) Notice: Subject to any disclaimer, the term of this patent is extended or adjusted under 35 U.S.C. 154(b) by 223 days.

(21) Appl. No.: 14/054,803

(22) Filed: Oct. 15, 2013

Related U.S. Application Data

(60) Provisional application No. 61/714,181, filed on Oct. 15, 2012.

(51) Int. Cl.
G06F 17/30 (2006.01)

(52) U.S. Cl.
CPC .............................. *G06F 17/30466* (2013.01)

(58) Field of Classification Search
CPC ......... G06F 17/30498; G06F 17/30463; G06F 17/30466
See application file for complete search history.

(56) References Cited

U.S. PATENT DOCUMENTS

| | | | |
|---|---|---|---|
| 5,511,186 A * | 4/1996 | Carhart | G06F 17/30566 |
| 6,385,604 B1 * | 5/2002 | Bakalash | C03B 37/02718 |
| 6,492,989 B1 | 12/2002 | Wilkinson | |
| 6,807,539 B2 * | 10/2004 | Miller | G06F 17/30545 |
| 7,023,453 B2 | 4/2006 | Wilkinson | |
| 7,176,924 B2 | 2/2007 | Wilkinson | |
| 7,290,007 B2 | 10/2007 | Farber et al. | |
| 7,426,520 B2 | 9/2008 | Gorelik et al. | |
| 8,082,243 B2 | 12/2011 | Gorelik et al. | |
| 8,442,999 B2 | 5/2013 | Gorelik et al. | |
| 8,874,613 B2 | 10/2014 | Gorelik et al. | |
| 9,336,253 B2 | 5/2016 | Gorelik et al. | |
| 2001/0054034 A1 * | 12/2001 | Arning | G06F 17/30333 |
| 2003/0023608 A1 * | 1/2003 | Egilsson | G06F 17/30333 707/999.1 |
| 2004/0103088 A1 * | 5/2004 | Cragun | G06F 17/30545 |
| 2006/0010143 A1 * | 1/2006 | Netz | G06F 17/30592 707/999.1 |

(Continued)

*Primary Examiner* — Ashish K Thomas
*Assistant Examiner* — Jedidiah Ferrer
(74) *Attorney, Agent, or Firm* — Morgan, Lewis & Bockius LLP

(57) ABSTRACT

A method dynamically combines data from multiple data sources. A visual specification for a data visualization requires data from a primary data source and one or more secondary data sources. The primary data source is independent of the secondary data sources. The visual specification includes a first set of dimension fields that specify a hierarchical level for the data visualization. A second set of dimension fields specify a hierarchical level for joining data sets from the data sources. The hierarchical level for joining data sets is more granular than the hierarchical level for the data visualization. For each data source, a query is generated, and a data set is retrieved from the data source using the query. A single combined data set is formed that includes the dimension fields in the first set. The combined data set is rolled-up and a data visualization is displayed using the rolled-up data.

20 Claims, 11 Drawing Sheets

(56) References Cited

U.S. PATENT DOCUMENTS

| | | | |
|---|---|---|---|
| 2006/0173813 A1* | 8/2006 | Zorola | G06F 17/30498 |
| 2007/0156734 A1* | 7/2007 | Dipper | G06F 17/30286 |
| | | | 707/999.101 |
| 2008/0016026 A1 | 1/2008 | Farber et al. | |
| 2009/0006370 A1* | 1/2009 | Li | G06F 17/30471 |
| | | | 707/999.005 |
| 2009/0319548 A1* | 12/2009 | Brown | G06F 17/30566 |
| 2010/0005054 A1* | 1/2010 | Smith | G06F 17/30498 |
| | | | 707/E17.002 |
| 2010/0077340 A1* | 3/2010 | French | G06Q 10/10 |
| | | | 715/781 |
| 2011/0131250 A1* | 6/2011 | Stolte | G06F 17/30592 |
| | | | 707/802 |
| 2012/0116850 A1* | 5/2012 | Abe | G06Q 10/067 |
| | | | 705/7.38 |
| 2012/0117453 A1* | 5/2012 | Mackinlay | G06F 17/30554 |
| | | | 715/212 |
| 2013/0080584 A1* | 3/2013 | Benson | G06F 17/30563 |
| | | | 709/217 |
| 2013/0191418 A1* | 7/2013 | Martin, Jr. | G06F 17/30569 |
| | | | 707/802 |

\* cited by examiner

BLENDING AND VISUALIZING DATA FROM MULTIPLE DATA SOURCES

PRIORITY

This application claims priority to U.S. Provisional Application Ser. No. 61/714,181, filed Oct. 15, 2012, entitled "Blending and Visualizing Data from Multiple Data Sources," which is incorporated by reference herein in its entirety.

TECHNICAL FIELD

The disclosed implementations relate generally to displaying graphical visualizations of data and more specifically to dynamically combining multiple data sources to produce a single data visualization.

BACKGROUND

Integrating data from multiple sources into a single data visualization is a complex task. Typically database administrators and IT staff use a middle tier application to set up formal statically modeled relationships between specific fields. In some systems, the data is then completely loaded into the middle tier and integrated there prior to any user queries. In other systems, the middle tier acts a proxy, rewriting a user's queries into federated queries that span multiple databases.

SUMMARY

The disclosed data blending features of the present application address both ease of use and performance. Instead of pre-building a static combined database, disclosed implementations are workload-driven. In other words, the integration points or linking fields between multiple data sets are dynamically derived based on the data required for a requested data visualization. In many cases, automatic schema matching can identify the links between the data sources, which allows users to explore their data sets without interruption. When necessary, implementations also provide a simple user interface for manual schema matching.

To leverage the capabilities of fast databases (e.g., SQL relational databases), some implementations compile a visual specification (e.g., in VizQL) into SQL or MDX queries and federate these queries to their respective data sources. Only the result sets (which may be much smaller than the set of raw data) are transferred back to the client visualization application. This allows users to work with very large data sets without the overhead of having to first collocate them in a single database (e.g., a data warehouse).

In addition, some implementations support combining data sets from two or more data sources at a fine granularity while composing coarse-grained visualizations. In particular, some implementations identify linking fields between the data sources that are not present in the visual specification (i.e., the linking fields will not appear in the requested data visualization). These implementations also enable users to construct dimensional filters from any data source without collocating entire copies of each data set. For example, a remotely located SQL database can be filtered using data from a mapping table constructed from another data source. Only the mapping table is sent to the SQL database for storage in temporary storage (e.g., TempDB). In this way, disclosed implementations collocate a minimal amount of information on each disparate system to achieve the desired semantics for both roll-up and filtering with high performance.

Some data sources do not support collocation of temporary data. For these data sources, a larger data set may be retrieved from the data source, then filtered or rolled-up locally on the client device that is preparing the data visualization. Some implementations dynamically detect which data sources support collocating data, and store a mapping table collocated with the data source when possible for maximal performance. In a single data visualization, there may be some data sources that support collocation and others that do not.

Some features that are present in implementations of the present invention include the following: federating queries to remote databases where they can execute efficiently close to the data; schema matching dynamically driven by the requested data visualization, which adapts to changes in the visualization on the fly as the user interacts with the data visualization software; a user interface for manual schema matching when automatic schema matching is not possible (or when a user chooses to override the automatic schema matching); using additional linking fields that are not present in the requested visualization; automatically collocating small subsets of data as needed to perform compute-intensive filtering and aggregation on a remote database; and automatically retrieving larger subsets of data for processing locally when remote collocation of data is not possible.

Some implementations provide a simple interface for manually defining or overriding the linking fields between multiple data sources. In some implementations, this is provided as a one-click interface using drag-and-drop. In some implementations, the data visualization application utilizes a dynamic mediated schema in which fields are added by a user. A user can "drop" additional fields onto a visual canvas to produce a data visualization, and extend the mediated schema as needed. Some implementations provide an affordance for each field from the selected data sources, which can be clicked to toggle the field's membership in the mediated schema. In some implementations, there is an icon on each affordance to indicate the state of each field's membership in the mediated schema.

In general, the linking fields between data sources are identified automatically based on field names (or captions) and the data types of those fields. For example, if two data sources each have a field called "department" and the data type is a character string, then the fields are automatically matched. However, if one of the fields was named "dept" instead, or had an integer data type, some implementations would not match the fields. In these cases, the user is provided an interface to manually identify linking fields. For example, a user might link a "department" field to a "dept" field.

In some implementations, the available functionality depends on the selected data sources and how they are linked or filtered. For example, some implementations offer additional analytical functionality when the data visualization application detects that one or more of the data sources enable building of temporary tables collocated with the data sources. For example, it would be impractical to retrieve 100 million records from a remote database to process locally on a client device. However, if a mapping table can be created and stored together with the main data source (e.g., in TempDB), then the 100 million records could be filtered and/or aggregated at the server, returning a much smaller set of records to be processed locally.

In some implementations, when a user changes a filter, in may be necessary to rebuild a filter or mapping table. In some instances, a new filter expression uses fields that already exist in a mapping table collocated at the primary data sources, and thus the data can be requeried without building a new mapping table. For example, this optimization may be possible for certain dimension filters expressed in terms of a linking field.

In some implementations, the final join between the primary data set (from the primary data source) and the other data sets always uses a left outer join. In this case, filtering of the results is based on the filters applied to the primary data source. Some implementations provide greater flexibility on how the data sets are joined, giving users greater control over join and filtering semantics. Some implementations provide sufficient functionality regarding how to combine data sources that the data sources can be effectively considered as tables within a single database.

Although the discussion below relates primarily to combining data sources to get fields (e.g., columns) from distinct data sources, the same basic techniques can be applied to create a single data set that combines rows from distinct data sources (similar to a UNION).

In accordance with some implementations, a method for dynamically combining data from multiple data sources is disclosed. The method is performed at a client device having one or more processors and memory. The memory stores one or more programs for execution by the one or more processors. The client device receives a visual specification for a data visualization from a user, which requires data from two or more distinct data sources (e.g., tables in an SQL database, a data cube, a spreadsheet, a text file, or a CSV file). The client device identifies one of the distinct data sources as a primary data source and identifies the remaining distinct data sources as secondary data sources. The primary data source is independent of the secondary data sources (e.g., the primary data source is not collocated with any of the secondary data sources and/or the primary data source and secondary data sources are accessed using distinct software applications). The client device identifies in the visual specification a first set of one or more dimension fields that specify a hierarchical level for the data visualization (which specifies at what level the numeric measures are aggregated for the overall data visualization). The client device also determines a second set of one or more dimension fields that specify a hierarchical level for joining data sets from the distinct data sources (which specifies at what level the numeric measures are aggregated in each of the data sets). The hierarchical level for joining data sets is more granular than the hierarchical level for the data visualization.

For each distinct data source, the client device generates a query based on the visual specification, which specifies aggregation of measure fields based on the second set of one or more dimension fields, and retrieves a data set from the data source using the query. The client device then forms a single combined data set that includes the one or more dimension fields specified in the first set. In some implementations, forming the single combined data set comprises performing an outer join locally at the client device with the retrieved data set from the primary data source as the outer data set with respect to all other data sets. The client device then rolls up the combined data set to form a final data set based on the one or more dimension fields from the first set, thereby aggregating each measure field in the combined set according to the one or more dimension fields specified in the first set. The client device then displays a data visualization according to the visual specification using the data from the final data set.

In some implementations, the visual specification specifies filtering based on one or more fields in one or more secondary data sources. The client device determines whether a computing system hosting the primary data source supports receiving and storing temporary tables collocated with the primary data source, and queries the primary data source accordingly. When the computing system hosting the primary data source supports receiving and storing temporary tables collocated with the primary data source, the client device creates a mapping table using records from one or more of the secondary data sources and transmits the mapping table to storage collocated with the primary data source. In this case, retrieving the data set from the primary data source includes executing the query for the primary data source, which filters data from the primary data source using data from the mapping table not present in the primary data source. On the other hand, when the computing system hosting the primary data source does not support receiving and storing temporary tables collocated with the primary data source, the client device generates the query for the primary data source that does not filter the primary data source based on the one or more fields in the one or more secondary data sources. In this case, after retrieving the data set from the primary data source, the client device filters the data set from the primary data source locally at the client device, using a local mapping table generated using records from one or more of the secondary data sources.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
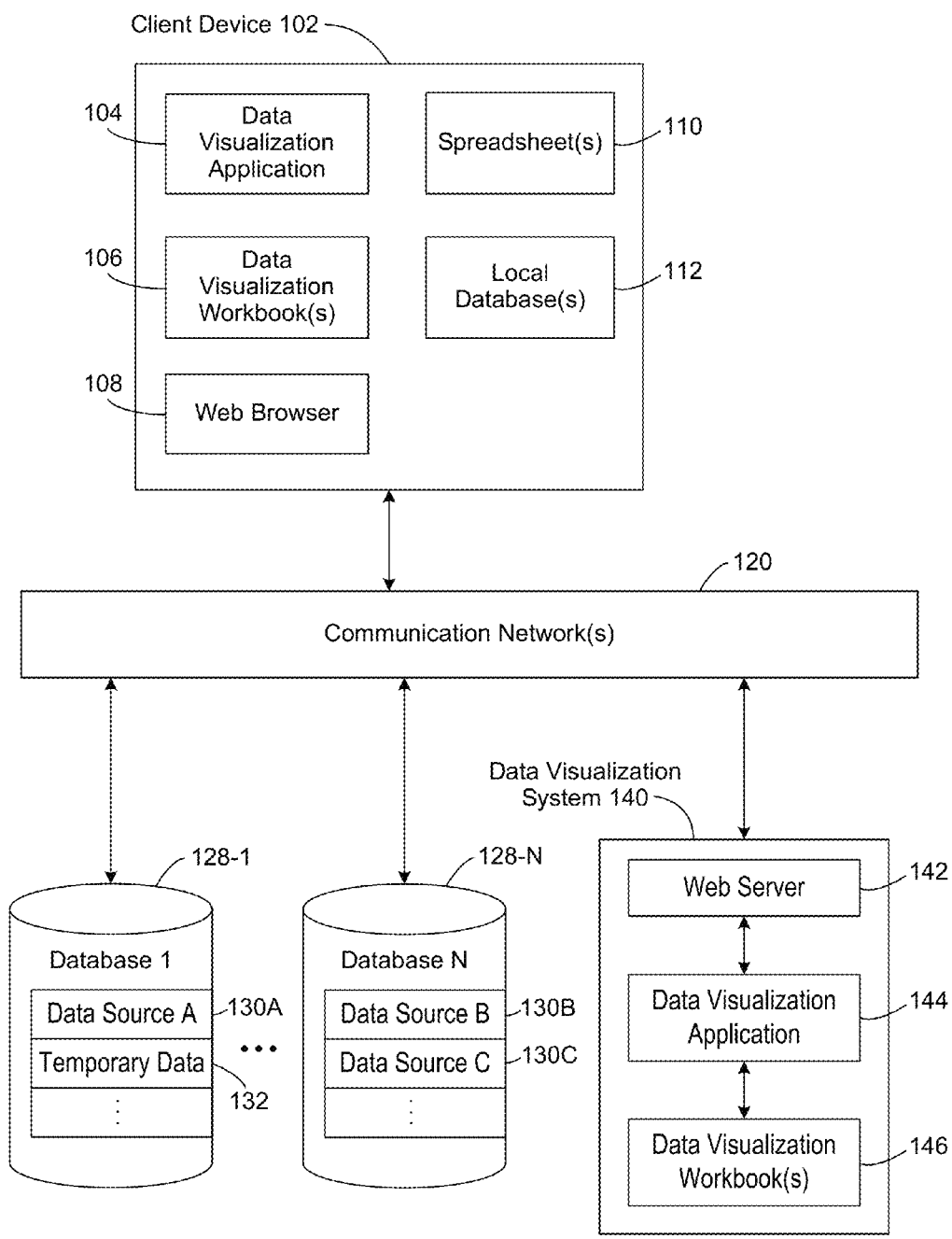
FIG. 1 is a block diagram illustrating a context in which some implementations operate.

FIG. 1 illustrates a context in which some implementations operate. A user uses a client device 102 to operate a data visualization application 104. Client devices 102 include desktop computers, laptop computers, tablet computers, and other computing devices. The user interacts with the data visualization application to identify data to be viewed and how that data is visualized (e.g., bar graphs, scatter plots, map plots, line graphs, and so on). Each data visualization is saved as a data visualization workbook 106. A workbook 106 typically includes both the visual specification as well as the corresponding data visualization generated based on the visual specification.

Typically the client device includes a web browser 108, which enables the user to access resources on the web, including web applications. In some implementations, a user can use the web browser 108 to access a web based data visualization application 144. When using a web-based data visualization application 144, corresponding workbooks may be saved locally on the client device (as workbooks 106) or saved with web-based application 144 (as workbooks 146). In some implementations, the storage location is determined based on the privacy setting for the workbooks (i.e., private workbooks are stored locally, whereas public workbooks are stored at the server). In some implementations, all workbooks are private to the author unless the author specifically grants permissions to others.

Each data visualization utilizes data from one or more data sources. In some cases, a user can utilize a spreadsheet 110 as a data source (e.g., an Excel® Workbook). Spreadsheet(s) 110 may be stored locally on the client device 102, or stored on a remote device, such as a file server. In some cases, a client device 102 stores one or more local databases 112 that can be used as data sources. One of skill in the art recognizes that there are many types of local databases 112, such as Microsoft® Access or MySQL.

The client device 102 connects to other databases or web resources over one or more communication networks 120, such as a local area network and/or the Internet.

In some implementations, a data visualization system 140 provides a web-based data visualization application 144. The web-based application 144 may provide the same functionality as a corresponding desktop data visualization application 106. Some implementations provide only one or the other of the data visualization application 106 and 144, or provide slightly different functionality (e.g., a web based data visualization application 144 may not be able to directly access spreadsheets 110 or local databases 112). The data visualization system 140 typically includes a web server 142 that receives requests from client devices and provides requested resources (e.g., access to the web-based data visualization application).

In addition, data visualization applications 106 and 144 may access remote databases 128-1, . . . , 128-N. As shown in FIG. 1, some databases, such as database 1 (128-1) include both data sources (e.g., data source A 130A) as well as storage for temporary data 132. In this illustration, Database N (128-N) includes multiple data sources (e.g., data source B 130B and data source C 130C), but does not include storage for temporary data.

Figure 2:
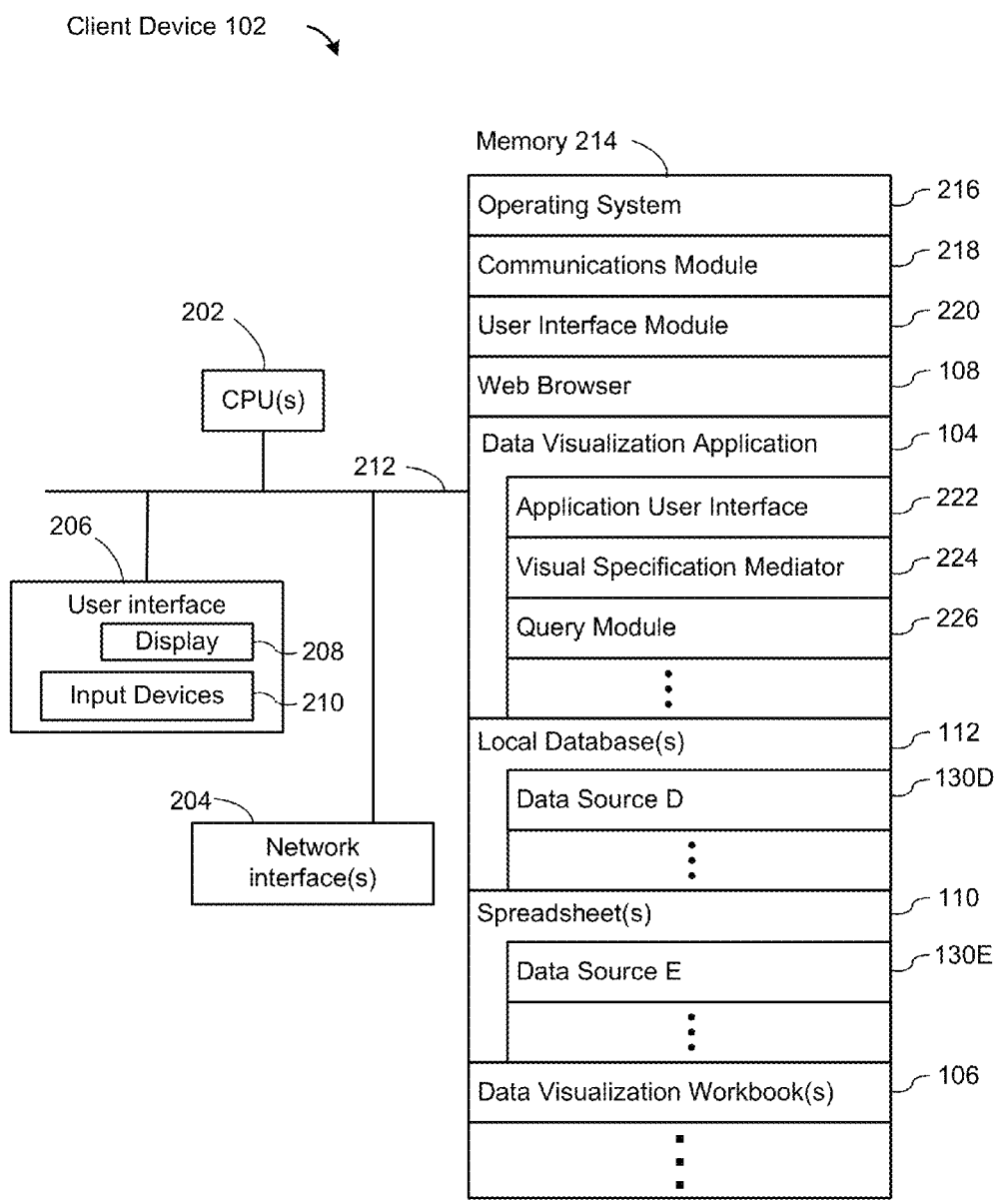
FIG. 2 is a block diagram illustrating a client device 102, in accordance with some implementations.

FIG. 2 is a block diagram illustrating a client device 102, in accordance with some implementations. The client device 102 typically includes one or more processing units (CPUs) 202, one or more network interfaces 204, memory 214, and one or more communication buses 212 for interconnecting these components. The client device 102 includes a user interface 206. The user interface 206 includes an associated display device 208 and one or more input devices 210 such as a keyboard, mouse, a touch sensitive display, or other input buttons. Optionally, the display device 208 includes an audio device or other information delivery device. Furthermore, some client devices 102 use a microphone and voice recognition to supplement or replace the keyboard.

Memory 214 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 214 may optionally include one or more storage devices remotely located from the CPU(s) 202. Memory 214, or alternately the non-volatile memory device(s) within memory 214, includes a non-transitory computer readable storage medium. In some implementations, memory 214 or the computer readable storage medium of memory 214 stores the following programs, modules, and data structures, or a subset thereof:

- an operating system 216, which includes procedures for handling various basic system services and for performing hardware dependent tasks;
- a network communication module 218, which is used for connecting the client device 102 to other computers via the one or more communication network interfaces 204 (wired or wireless) and one or more communication networks, such as the Internet, other wide area networks, local area networks, metropolitan area networks, and so on;
- a user interface module 220 for receiving user input from the input devices 210 and displaying a user interface on the display device 208 associated with the client device 102;
- a web browser 222, which enables a user to access resources, web pages, and web applications over a communication network 120;
- a data visualization application 104, which enables a user to create a visual specification for a data visualization, and creates data visualizations corresponding to the visual specifications. The data visualization application 104 includes an application user interface 222, which enables a user to specify what data is desired and how it will be formatted visually. The user interface 222 allows a user to select fields from two or more distinct data sources 130. The data visualization application 104 also includes a visual specification mediator 224, which identifies which data sources are needed, what fields are needed from each data source, and so on. The data visualization application 104 also includes a query module 226, which constructs queries for each of the data sources 130, executes the queries, and combines the result sets from each of the queries into a single result set;
- one or more local databases 112, as described above with respect to FIG. 1. A local database may include one or more data sources, such as data source D 130D;
- one or more spreadsheets 110, as described above with respect to FIG. 1. A spreadsheet 110 may include one or more data sources, such as data source E 130E; and
- one or more data visualization workbooks 106, which are used by the data visualization application 104 to store visual specifications, data corresponding to the visual specifications, and/or corresponding visual representations.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some implementations, memory 214 may store a subset of the modules and data structures identified above. Furthermore, memory 214 may store additional modules or data structures not described above.

Although FIG. 2 shows a client device 102, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
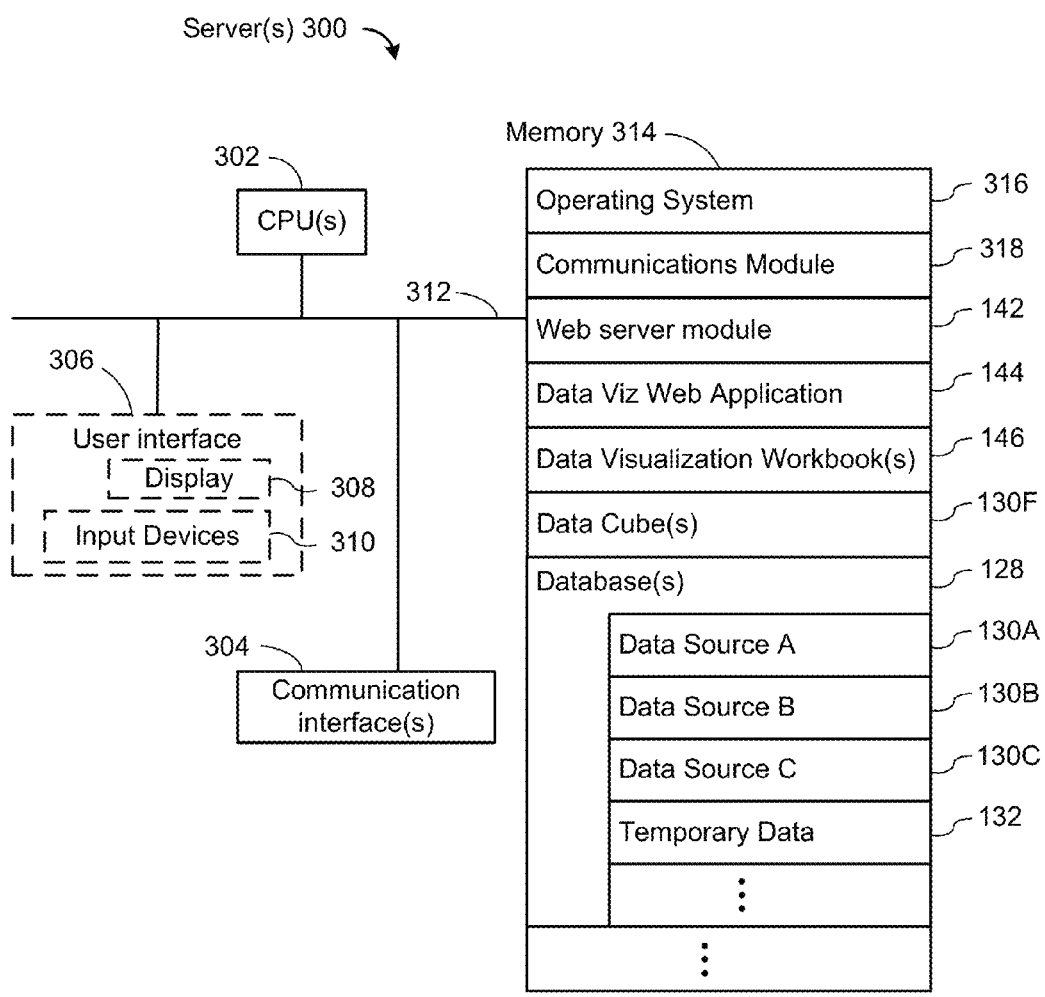
FIG. 3 is a block diagram illustrating a server 300, in accordance with some implementations.

FIG. 3 is a block diagram illustrating a server 300, in accordance with some implementations. A server 300 may host one or more databases 128 or a data visualization system 140, or both. A server 300 typically includes one or more processing units (CPUs) 302, one or more network interfaces 304, memory 314, and one or more communication buses 312 for interconnecting these components. In some implementations, the server 300 includes a user interface 306, which includes a display device 308 and one or more input devices 310, such as a keyboard and a mouse.

Memory 314 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 314 may optionally include one or more storage devices remotely located from the CPU(s) 302. Memory 314, or alternately the non-volatile memory device(s) within memory 314, includes a non-transitory computer readable storage medium. In some implementations, memory 314 or the computer readable storage medium of memory 314 stores the following programs, modules and data structures, or a subset thereof:

- an operating system 316, which includes procedures for handling various basic system services and for performing hardware dependent tasks;
- a network communication module 318, which is used for connecting the server 300 to other computers via the one or more communication network interfaces 304 (wired or wireless) and one or more communication networks 120, such as the Internet, other wide area networks, local area networks, metropolitan area networks, and so on;
- a web server module 142, which receives resource requests from client devices and responds by providing corresponding resources, such as data from a database 128 or a user interface for a web-based data visualization application 144;
- a data visualization web application 144, which provides functionality for building a data visualization, similar to the client data visualization application 104 described above with respect to FIGS. 1 and 2; in some implementations, the data visualization web application 144 stores one or more data visualization workbooks 146 at the server 300. These stored workbooks 146 are similar to the workbooks 106 stored at a client device, as described above with respect to FIGS. 1 and 2;
- one or more data cubes 130F, which are data sources that include two or more dimensions and pre-computed aggregated totals for one or more measures; and
- one or more databases 128 for storing data that may be used in one or more data visualizations. A single database 128 may include one or more data sources 130A, 130B, and 130C. In some implementations, a database 128 also includes temporary storage 132, which can be used by a client device to create temporary tables that are used to query a data source 130 (e.g., joining a temporary mapping table to one or more other tables). A data source 130 may consist of a single table or view, or may comprise joining together multiple tables or views. For example, a data source 130 in a SQL database may comprise any SQL query.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, memory 314 may store a subset of the modules and data structures identified above. Furthermore, memory 314 may store additional modules or data structures not described above.

Although FIG. 3 shows a server 300, FIG. 3 is intended more as functional description of the various features that may be present rather than as a structural schematic of the implementations described herein. In practice, and as recognized by those of ordinary skill in the art, items shown separately could be combined and some items could be separated.

Figure 4:
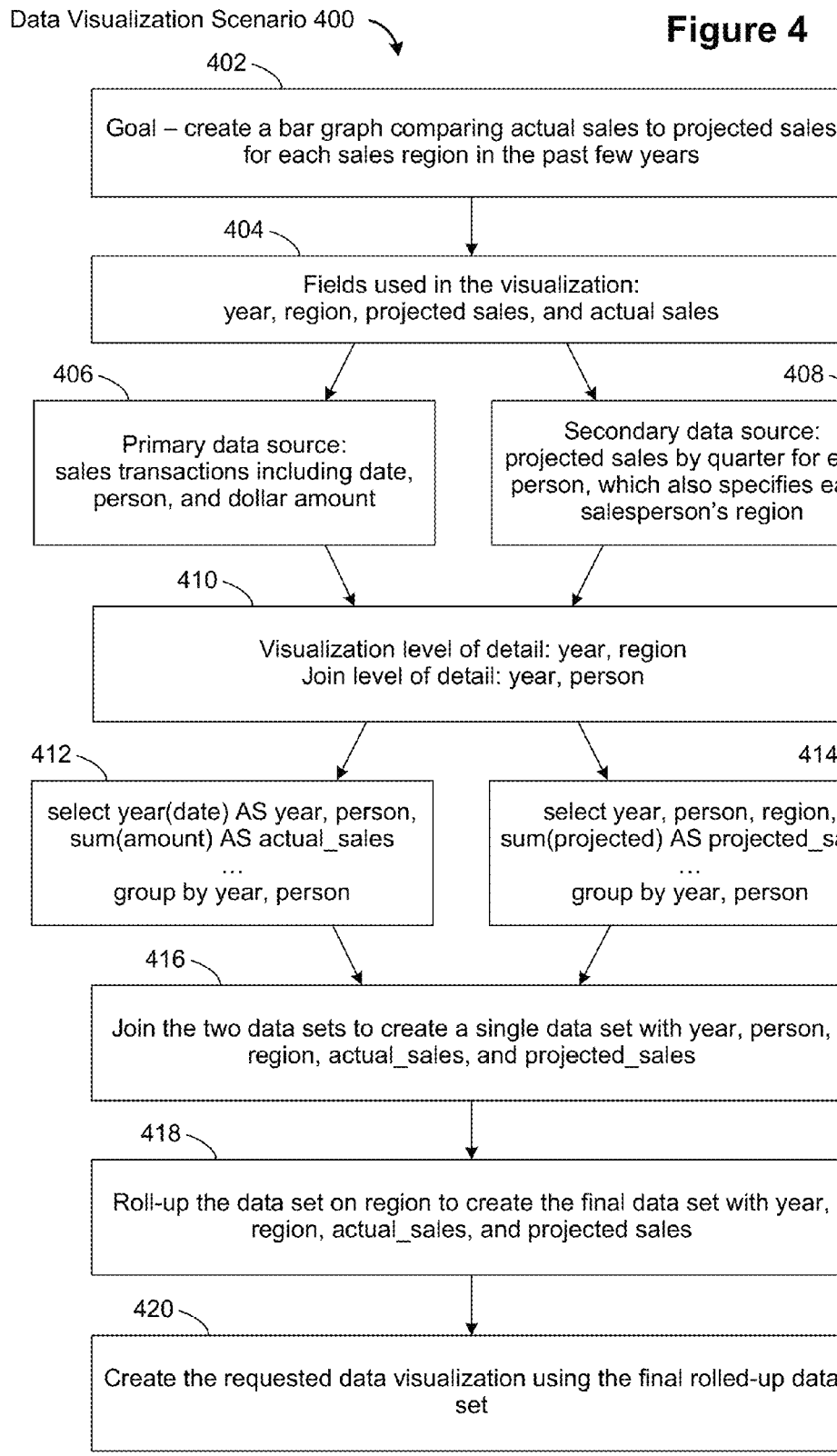
FIGS. 4 and 5 illustrate two sample scenarios of combining data from two data sources in accordance with some implementations.

FIG. 4 illustrates a sample data visualization scenario 400 according to some implementations. In this scenario 400, the goal of the user is (402) to create a bar graph comparing actual sales to projected sales for each sales region in the past few years. The data visualization needs (404) a data set with the fields year, region, projected sales, and actual sales. However, the data is not all in one data source and not organized in a way that is convenient for this report. Available to the user are two distinct data sources, each with a portion of the data, each in a different format. For example, the data sources could include different fields (e.g., one data source has a date field whereas another data source has a "year" field), have different levels of granularity, be stored in different file formats, stored on different devices, and so on.

In this example scenario, actual sales are stored in a primary data source that includes (406) sales transactions that specify sales date, sales person, and the dollar amount of the sale. In some implementations, this primary data source is in a SQL relational database. On the other hand, a secondary data source stores (408) projected sales by quarter for each sales person, and also specifies the region for each sales person. In some implementations, the secondary data source is a spreadsheet 110, such as an Excel® workbook. As illustrated in this scenario, not only is the data in two places, but there are additional complexities: the region for each sales person is stored only in the secondary data source; the actual sales transactions have a sales date, which must be translated into a year, and the sales projections are specified by quarter rather than year.

Figure 8:
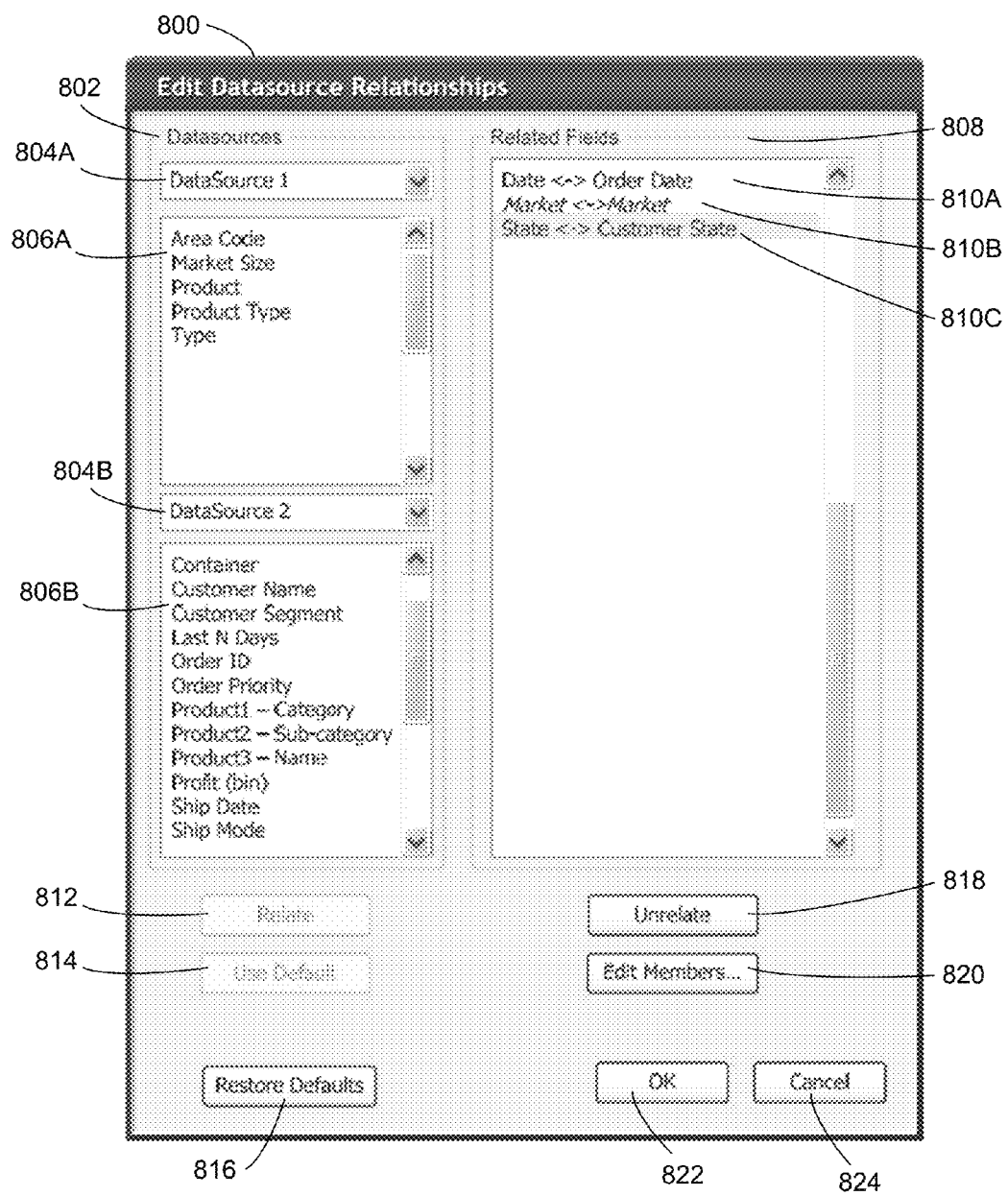
FIG. 8 illustrates a user interface window for manually matching fields from two data sources in accordance with some implementations.

In this illustrated scenario 400, the two data sources both have a "person" field, and the person fields have the same data type, so the data visualization application 104 is able to automatically match these fields. In other circumstances, the match might not be clear. For example, one data source could use "person" whereas the other data source might use "salesperson." Even if both data sources have a field named "person," they may be stored differently. For example, if the "person" field stores an ID number, then one data source may store it as a number whereas the other data source may store it as a character string. If the data visualization application cannot person automatic matching, then a user interface is provided for a user to manually identifying linking fields, as shown in FIG. 8.

For the final visualization, the level of detail is (410) by year and region (i.e., each data point or visual mark for the data visualization corresponds to a single year and region combination). On the other hand, because the region is not included in the sales transaction data, the data from the two data sources has to be combined at a more granular level. In this case, the level of detail for joining the two data sources is (410) year and person.

For the primary data source, the query may be of the form (412) "select year(date) AS year, person, sum(amount) AS actual_sales . . . group by year, person . . . " This retrieves the desired data at the appropriate hierarchical level (i.e., year and person).

For the secondary data source, the query may be of the form (414) "select year, person, region, sum(projected) AS projected_sales . . . group by year, person . . . " Of course if the secondary data source is not a SQL database, the actual query would be expressed differently. Note that the sales projections are stored by quarter in the secondary data source, so the grouping combines the quarters for each year into a single record in the result set. Also, the region is included because it is needed for the final data visualization.

Because the two separate data sets are created at the same level of detail (the join level hierarchy), they can be joined (416) to create a single data set with year, person, region, actual_sales, and projected_sales. In some implementations, the join is a left outer join between the primary and secondary data sources. In some implementations, the join between the data sources is user configurable. Once the data sets are combined into a single data set at the client device 102, the query module 226 rolls up (418) the data to the region level in the hierarchy to create the final data set with year, region, actual_sales, and projected_sales, as needed for the requested data visualization. The data visualization application 104 then uses the final data set to create (420) the requested data visualization.

This example scenario illustrates that a user is able to specify the desired data in a simple way, and the data visualization application handles the complexities of how to retrieve the desired data and display it visually.

Figure 5:
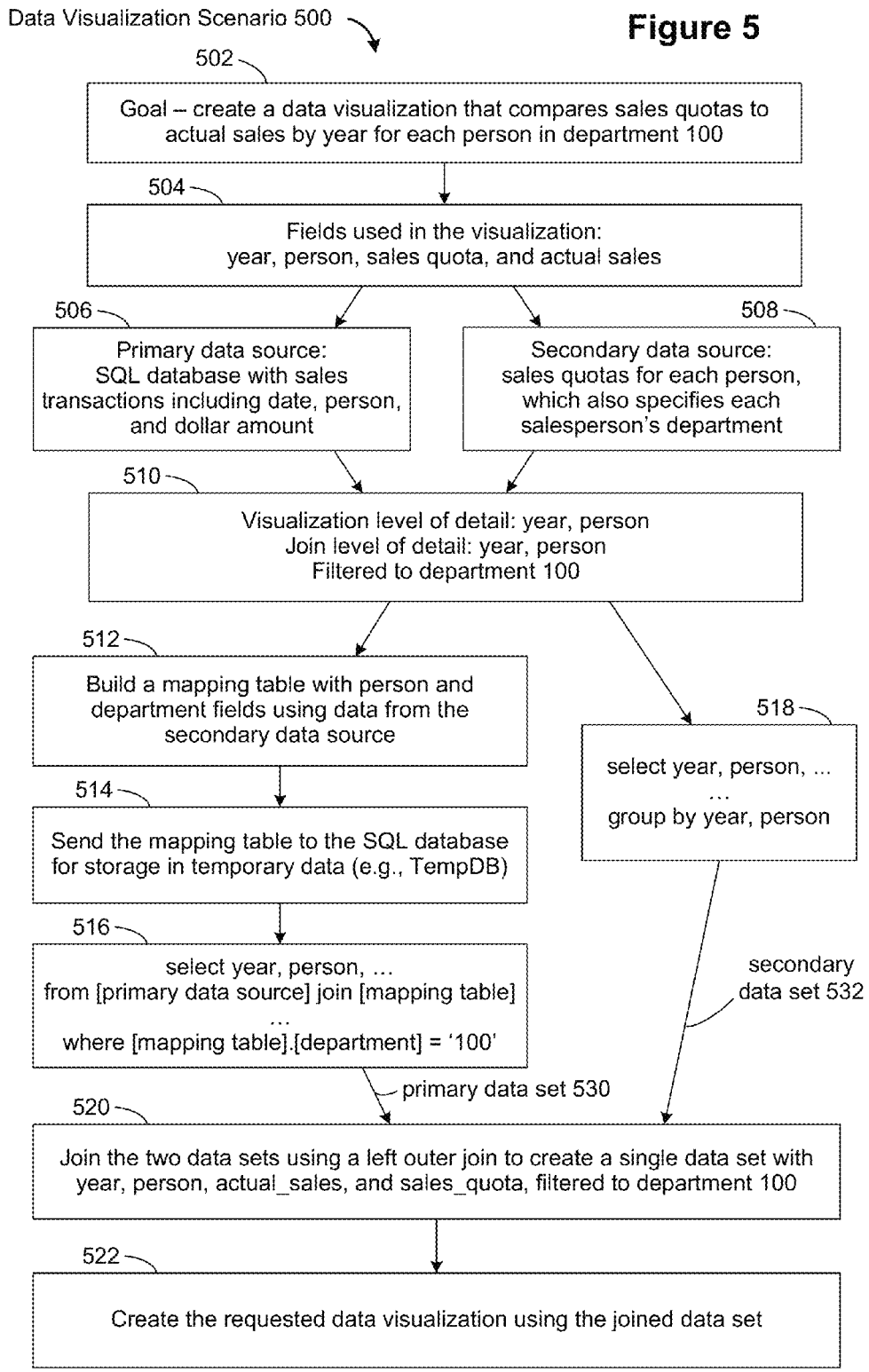

FIG. 5 provides a second sample scenario 500 of a data visualization using two data sources. In this scenario the goal is (502) to create a data visualization that compares sales quota to actual sales by year for each person in department 100. For purposes of this scenario, there may be hundreds or thousands of departments with sales people, but the user is specifically interested in department 100. When looking at a small portion of data, as here, an important consideration is performance in retrieving the desired data. A simple, but inefficient method here would be to retrieve sales data from the remote server for all of the sales people, regardless of department. But retrieving all of the data would waste time, network bandwidth, and the resources of the remote database server.

For this data visualization, the fields needed are (504) year, person, sales quota, and actual sales. The visual specification mediator 224 identifies which data is in each of two data sources and provides this information to the query module 226.

The primary data source is (506) a SQL database with sales transaction table that include the date of each sales transaction, the sales person, and the dollar amount of the sale. The sales transaction table does not specify the department of each sales person. For purposes of this scenario, there is no table at this SQL database that correlates a sales person with a department. The secondary data source is a local database 112 or spreadsheet 110 that stores (508) annual sales quotas for each person. The secondary data source also specifies the department associated with each sales quota record. In this scenario, both the visualization level of detail and the join level of detail are year and person. The queries for each of the data sources will aggregate the sales data at this level, and this level of detail will be provided in the final data visualization. As noted above, the data is limited to (510) department 100.

The secondary query is expressed in a form (518) such as "select year, person, . . . group by year, person . . . " If the sales quotas are designated by year, then the query just needs to select the quota. On the other hand, if the sales quotas are for a smaller portion of time (e.g., month or quarter), then the sales quotas need to be aggregated for each year (for each person). When the secondary query is executed against the secondary data source, a secondary data set 532 is retrieved.

In this scenario, the query module 226 determines that the remote SQL database storing the primary data source is capable of storing temporary table, which could be used for optimal performance. The query module builds (512) a mapping table with the "person" and "department" fields from the secondary data source. At this stage, the mapping table may exist as the text of SQL commands such as "create table #map . . . ", "insert into #map . . . ", and so on. The query module then sends (514) the temporary mapping table to the SQL database for storage in temporary data (e.g., TempDB or in memory). The query module then generates a query for the primary data source that includes the mapping table, such as (516) "select year, person, . . . from [primary data source] join [mapping table] . . . where [mapping table]·[department]='100' . . . " By including the mapping table in the query, only the relevant records are included in the data set returned to the client device 102. When the query is executed, the SQL database returns the primary data set 530, which includes only records people in department 100.

Once the primary and secondary data sets 530 and 532 are retrieved, the query module 226 joins (520) the two data sets using a left outer join to create a single data set with year, person, actual sales, and sales quote, filtered to just the people in department 100. As is known in the art, a "left outer join" between two tables includes all rows from the left table that match rows in the right table as well as rows in the left table that have no matching row in the right table. Note that this example does not specifically address the complexity of having sales people transfer into or out of department in the middle of the year.

Once the final combined data set is constructed, the data visualization application 104 creates (522) the requested data visualization using the joined data set.

Figure 6:
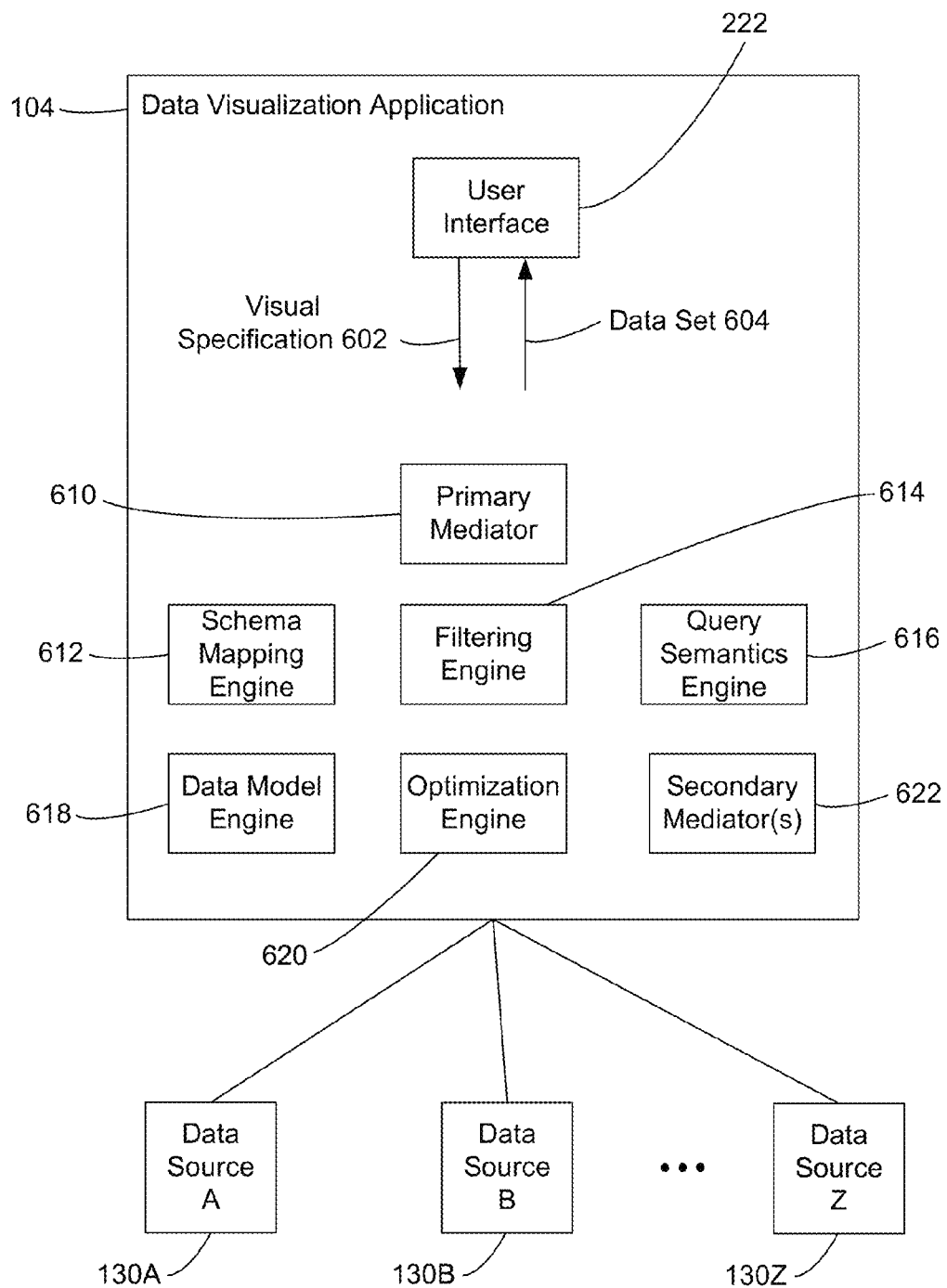
FIG. 6 illustrates some features of a data visualization system that can combine data from multiple data sources in accordance with some implementations.
Figure 7A:
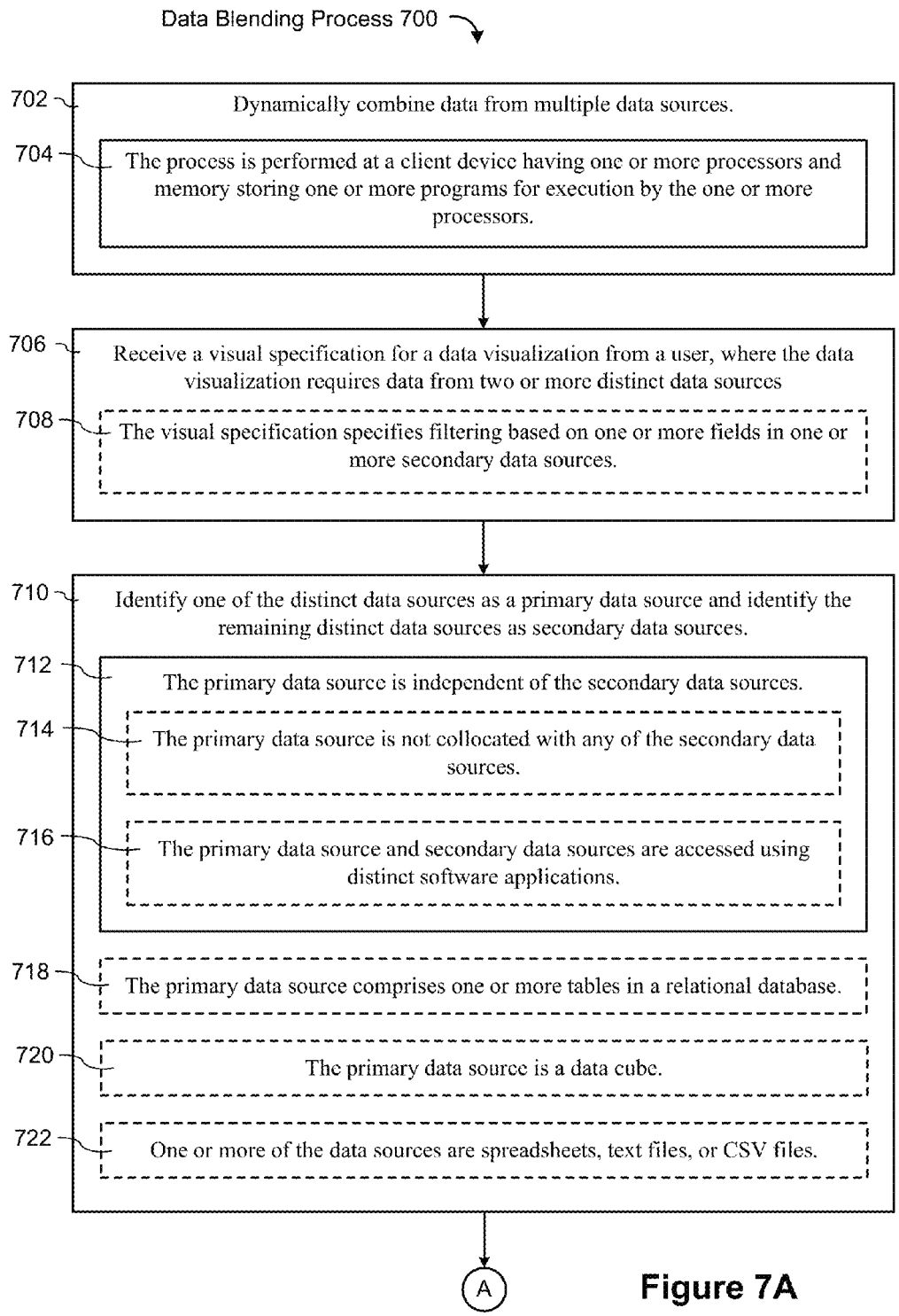
FIGS. 7A-7D are a process flow diagram for dynamically combining multiple data sources to create a data visualization in accordance with some implementations.
Figure 7B:
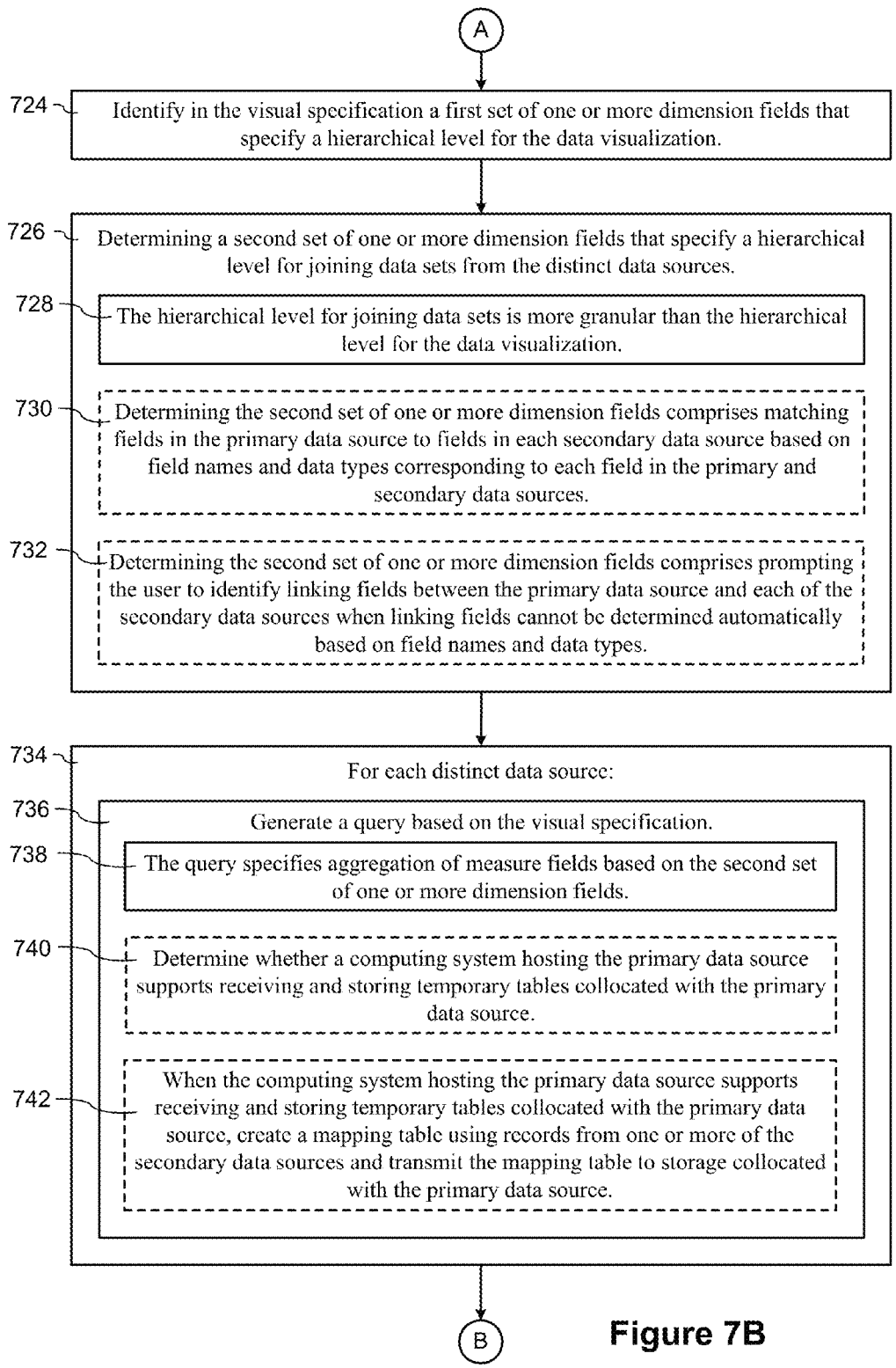
Figure 7C:
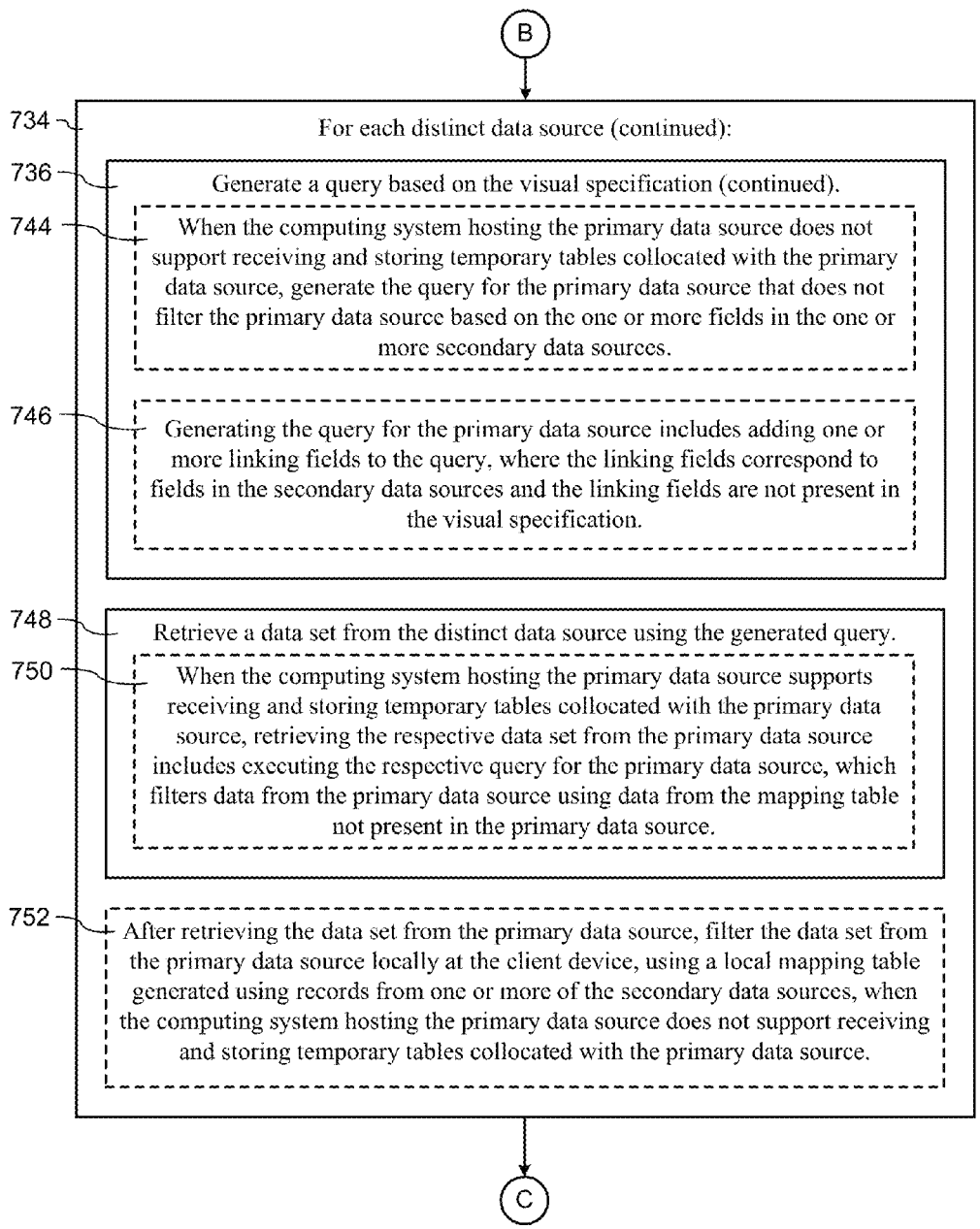
Figure 7D:
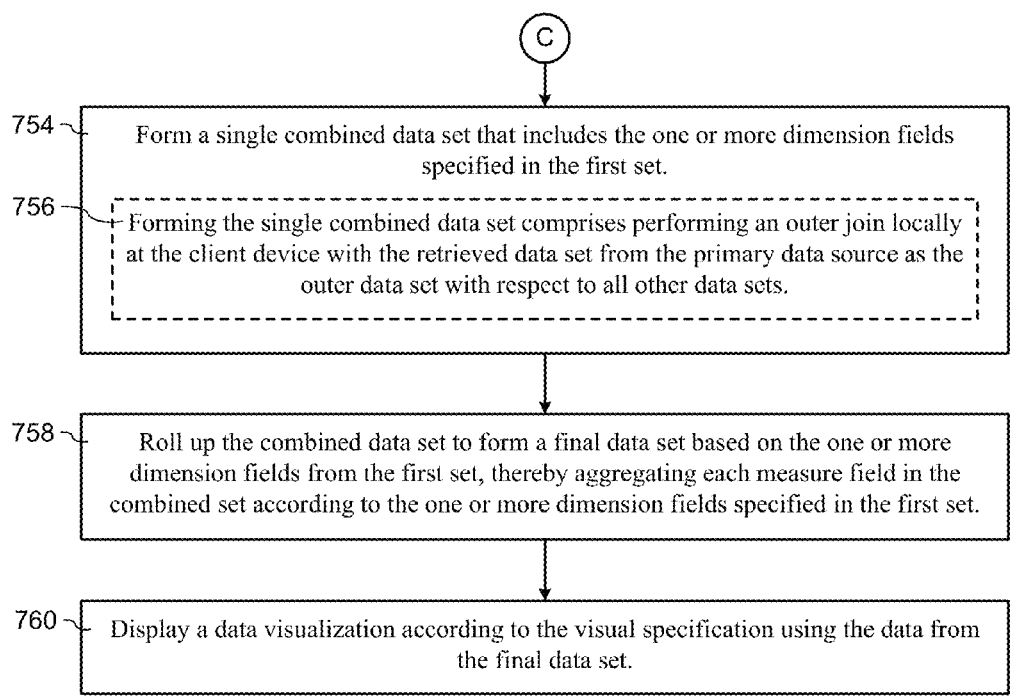

FIG. 6 illustrates some features of a data visualization system that can combine data from multiple data sources in accordance with some implementations. Using a data visualization user interface 222 provided by a data visualization application 104 at a client device 102, a visual specification 602 is constructed that specifies what data to use, how the data is aggregated, filtered, and sorted, and how the data will be displayed. In some implementations, the data visualization application 104 employs a federated query system.

The schema matching between data sources is performed dynamically based on the particular fields currently in use in the visual specification 602. A user can change how the fields are matched through simple direct operations, such as drag-and-drop, using listings of the fields for each of the data sources. The same user interface for manual matching can be used when automatic schema matching is not able to identify linking fields.

In some implementations, the data visualization application 104 includes a primary mediator 610 that partitions the fields from the visual specification 602 into one or more queries for remote execution as well as local computation. The primary mediator 610 uses a local data model (e.g., a mediated schema) based on the data sources. In some implementations, the primary mediator also joins together the individual data sets from the data sources to produce a single final data set 604 for use in the data visualization.

In some implementations, the data visualization application 104 includes a schema mapping engine 612 for building a mapping table for each data source to represent the relationship of fine-grained linking fields to coarse-grained dimensions in the data visualization. This was illustrated above in FIG. 5.

In some implementations, the data visualization application 104 includes a data model engine 618 for extending each mapping table with user-defined data modeling operations performed outside of each associated data source.

In some implementations, the data visualization application 104 includes a filtering engine 614 for building a filter table for each data source to enable applying filter rules defined on fields from other data sources. This was illustrated above in FIG. 5.

In some implementations, the data visualization application 104 includes an optimization engine 620 to support faster execution. In some implementations, the optimization engine 620 collocates mapping tables and/or filter tables at a remote data source in order to join with the primary data source, resulting in faster execution at the remote database and less overhead to return a smaller data set to the client device. In some implementations, the optimization engine 620 rewrites fine-grained local computation (that would have occurred at the client device) as fine-grained remote computation at the data source followed by coarse-grained local computation. This was illustrated above in FIGS. 4 and 5. In some implementations, the optimization engine 620 includes a mechanism for detecting the capability of each data source for supporting the collocation required for optimization (e.g., availability of user-utilizable temporary storage 132).

In some implementations, the data visualization application 104 includes a query semantics engine 616 for preserving functionality during optimizer rewriting by automatically replacing non-additive measures with their constituent additive components. This can prevent aggregation of non-additive measures that would produce meaningless results.

In some implementations, the data visualization application 104 includes one or more secondary mediators 622, which execute the tasks to collocate mapping and filter tables at a remote data source, compiling queries, executing queries, and processing query results.

As illustrated in FIG. 6, the data visualization application 104 can access multiple data sources, such as data source A 130A, data source B 130B, . . . and data source Z 130Z. An individual data visualization has a single primary data source and zero or more secondary data sources. As illustrated in FIGS. 1-3, the data sources may have a wide variety of formats, accessed by various software applications, and may be stored locally on the client device 102 or remotely at a server 300.

FIGS. 7A-7D provide a process flow diagram 700 for dynamically combining (702) multiple data sources to create a data visualization in accordance with some implementations. The process is performed (704) at a client device 102 having one or more processors and memory. The memory stores (704) one or more programs for execution by the one or more processors.

The client device builds (706) a visual specification 602 for a data visualization based in selections by a user. In some cases, the data visualization requires (706) data from two or more distinct data sources. In some cases, the visual specification 602 specifies (708) filtering based on one or more fields in one or more secondary data sources.

The data visualization application 104 identifies (710) one of the distinct data sources as the primary data source and identifies the other data sources as secondary data sources. In some implementations, the distinction between the primary and secondary data sources is based on which data is selected first, or based on designation by the user. When the data sources are combined using an outer join, the final result set depends on the selection of the primary data source, and this is explained to the user through tooltips, online help, and written documentation. In some implementations, the primary data source is automatically selected based on the chosen fields, and may allow for override by the user.

As noted above, each of the data sources is distinct. For example, choosing two distinct columns from a spreadsheet is still using a single data source. In a relational database, two selected columns from different tables are still part of the same data source if there is a schema-defined relationship between the two tables (e.g., one of the tables includes a foreign key to the other table).

Disclosed implementations here support the case where the primary data source is (712) independent of the secondary data sources. In some cases, the primary data source is independent because it is not (714) collocated with any of the secondary data sources (e.g., on physically distinct servers at physically distinct sites). In some cases, the primary data source is independent because the primary data source and the secondary data sources are accessed (716) using distinct software applications. For example, a spreadsheet may be accessed using Microsoft® Excel®, whereas other data sources may be stored in an Oracle® database or a MySQL database.

As noted previously, a data source can be stored and accessed in many different formats. In some cases, the primary data source comprises (718) one or more tables in a relational database. In other cases, the primary data source is (720) a data cube. Typically, a data cube has two or more dimension fields and one or more measure fields that can be aggregated (e.g., sum or average). Each distinct combination of dimension field values defines a cell, and the cube stores the aggregated measures for each cell. Relational databases and cubes may also be used for secondary data sources. Data sources come in many other formats as well, including (722) spreadsheets, text files (e.g., with a specific format for each "row" of data between carriage returns), CSV files (rows of data separated by commas, typically with each value stored as quoted strings, or local databases, such as a Microsoft® Access® database.

The data visualization application 104 identifies (724) in the visual specification 602 a first set of one or more dimension fields that specify a hierarchical level for the requested data visualization. For example, in the scenario 400 in FIG. 4 the hierarchical level is defined by the set {year, region}, and in the scenario 500 in FIG. 5 the hierarchical level is defined by the set {year, person}. This first set defines the level of detail for the data visualization. In particular, it defines the level at which the measure fields are aggregated.

The hierarchical level for a data visualization is defined by the visual specification 602 created by the user. However, when there are multiple data sources, it may be necessary to join the separate data sets at a different hierarchical level. The hierarchical level for joining data sets is determined (726) based on the schemas of the multiple data sources. The second hierarchical level is (726) a second set of one or more dimension fields. Implementations of the present invention support the case where the hierarchical level for joining data sets is (728) more granular than the hierarchical level for the data visualization. This is illustrated above in FIG. 4, where the first set of columns is {year, region}, whereas the second set of columns is {year, person}, which is more granular because a single region can include many sales people.

In some implementations, determining the second set of one or more dimension fields comprises matching fields in the primary data source to fields in each secondary data source based on field names and data types corresponding to each field in the primary and secondary data sources. For example, in the scenario 400 of FIG. 4, the visualization will display data by region, but the region is not included in both of the data sources. Therefore, the data for each of the data sources has to be joined by person, which is more granular and included in both of the data source. (In this example, each person is assigned to a unique region for each year.)

In some cases it is not possible to automatically match fields from two distinct data sources or automat matching results in incorrect matches that have to be manually corrected. Therefore, in some cases, determining the second set of one or more dimension fields comprises prompting the user to identify linking fields between the primary data source and each of the secondary data sources. Typically automatic matching yields correct links between data sources, so manual identification of linking fields occurs only when linking fields cannot be determined automatically based on field names and data types.

For each distinct data source (734), the data visualization application performs a number of operations to retrieve an appropriate data set, which will later be combined with the other data sets. The work for each data source includes: generating (736) an appropriate query based on the visual specification 602 (as well as the join level of detail), then executing the query to retrieve (748) a data set from the data source. In each case, the generated query specifies (738) aggregation of measure fields based on the second set of one or more dimension fields.

In some implementations, generating (736) a query for a data source includes (740) determining whether the computing system that hosts the data source supports receiving and storing temporary tables collocated with the data source. When the computing system hosting the primary data source does support (742) receiving and storing temporary tables collocated with the primary data source, the data visualization application 104 creates (742) a mapping table using records from one or more of the secondary data sources and transmits the mapping table to storage collocated with the primary data source. When the computing system hosting the primary data source does not support (744) receiving and storing temporary tables collocated with the primary data source, the data visualization application 104 generates (744) the query for the primary data source that does not filter the primary data source based on the one or more fields in the one or more secondary data sources.

In some cases, generating the query for the primary data source includes adding (746) one or more linking fields to the query. The linking fields correspond (746) to fields in the secondary data sources and the linking fields are not present in the visual specification.

When the computing system hosting the primary data source supports (750) receiving and storing temporary tables collocated with the primary data source, retrieving (750) the respective data set from the primary data source includes executing (750) the respective query for the primary data source, which filters data from the primary data source using data from the mapping table not present in the primary data source. On the other hand, when the computing system hosting the primary data source does not support (752) receiving and storing temporary tables collocated with the primary data source, the data visualization application 104 filters the data set from the primary data source locally at the client device, using a local mapping table generated using records from one or more of the secondary data sources, after retrieving the data set from the primary data source.

Using the data sets retrieved from each of the data sources, the data visualization application 104 forms (754) a single combined data set that includes the one or more dimension fields specified in the first set. This is illustrated in FIGS. 4 and 5 above. In some implementations, forming the single combined data set comprises (756) performing an outer join locally at the client device with the received data set from the primary data source as the outer data set with respect to each of the other data sets. In some implementations, the user can specify whether to use an outer join or an inner join. In some implementations, the user can specify more complex ways to join multiple data sources.

The data visualization application 104 then rolls-up (758) the combined data set to form a final data set based on the one or more dimension fields from the first set, thereby aggregating each measure field in the combined set according to the one or more dimension fields specified in the first set. The data visualization application 104 uses (760) the data from the final data set to display (760) a data visualization according to the visual specification 602.

FIG. 8 illustrates a user interface window 800 for manually matching fields from two data sources 130 in accordance with some implementations. This is part of the application user interface 222. On the left side of the window 800 is a Datasources frame 802, which displays the selected data sources 804A and 804B as well as the data source field lists 806A and 806B. In some implementations, the field lists 806A and 806B include only fields that are not already included in a relation. In this illustration, the Related Fields frame 808 displays both fields that were automatically matched (Market<->Market 810B) as well as fields that were manually related (Date<->Order Date 810A and State<->Customer State 810C). In this implementation, fields that were matched automatically are shown in an italic font, whereas fields that are matched by a user are shown in a non-italic font. In this implementation, these fields that have already been matched (either automatically or manually) are excluded from the field lists 806A and 806B.

In this implementation, a user can select a single field from each of the lists 806A and 806B, then click the relate button 812 to identify them as matched fields, which then move into the Related Fields frame 808. In the illustration of FIG. 8, not fields from lists 806A and 806B are selected, so the Relate button 812 is inactive (dimmed in the figure). This implementation also includes an Unrelate button 818 which has the opposite effect. Because the related fields State<->Customer State 810C is currently selected, the Unrelate button 818 is active. If the user clicks the Unrelate button 818, the highlighted relation is removed and the fields involved become available on the field lists 806A and 806B.

Some implementations provide a button, such as the displayed "Use Default" button 814 to return a single schema match to its default state. Some implementations include a "Restore Defaults" button 816, which returns all schema matches to the default state. The default state consists of the schema matches that were determined automatically. Some implementations include an "Edit Members . . . " button 820, which allows a user to edit how the pair of fields is related. For example, some implementations enable a user to define a relationship between a pair of fields that is not just ordinary equality. Some implementations enable creating field matches that involve more than a single field from each of the data sources. For example, field C in one data source may be the concatenation of fields A and B in another data source.

This schema matching window includes standard OK button 822 and Cancel button 824, which perform as expected, either saving the changes or abandoning any changes.

The disclosed implementations support many scenarios in addition to those illustrated in FIGS. 5 and 6. For example, a user explores a timeline of car recalls using data from the NHTSA with details of each defective part. A separate data set organizes the defective parts by their manufacturer. The user wishes to explore trends over time per manufacturer, and blends this data set into a data visualization by using the [Manufacturer] field to specify a color (i.e., each manufacturer is displayed as a different color). Because there are no linking fields in the visualization, the user is prompted to select a linking field. With a single click the user defines the linking field as the [Defective Part] field present in each data set.

As another example, a corporate merger results in two large, separate corporate databases. Analysts in the company must now query both sets of data to show total budget versus expenditures for each combined department. Here, the data visualization application 104 federates the visual queries to each database to take advantage of the performance of each database. Only small amounts of result set data are transferred over the network, representing the filtered and aggregated views of interest to the analysts.

In an example of filtering, a journalist explores leading and lagging indicators between the contenders in the 2012 US Presidential Election. The journalist studies the national tours of each campaign, along with Twitter® follower trends, campaign contributions, state-by-state polling and regional demographics. The data is linked by date, city, and state, but the leading and lagging indicators are displayed purely by date. To isolate the effects of prominent campaign stops, the journalist creates a filter to keep only the largest cities in swing states. This filter is defined using the demographic data set, but it affects the aggregated summary data from all data sets used in the data visualization.

Some data visualizations utilize densification or domain completion as illustrated in the following example. A user wishes to combine two data sets that are linked by date with events spaced unevenly over time. The data model allows users to expand the domain of a continuous dimension such as time to produce a dense domain with no gaps. When a densified dimension is used as a linking field but is not present in the data visualization, the data visualization application constructs the necessary state on the remote database for representing this data model. In this fashion a local data modeling operation can still impact the results of a remote database query.

In some instances it is useful to "clean-up" the raw data dynamically for a data visualization. In some implementations, the data model enables users to manually clean and shape their data using simple user interfaces. For example, a user may correct misspellings or resolve equivalent entities to provide new dimensionality. The cleaned and/or reshaped representations of data can be especially useful when applied to a dirty data set that the user wishes to blend with a well-structured database. As with densification, these operations are local to the data visualization application (i.e., not modifying the permanent data source) but can be leveraged as linking fields. The data visualization application automatically constructs the necessary representations of this data model on the remote database to allow such fields to be used as linking fields, even when the fields are not present in the final data visualization.

The present application allows broader use of features for any data source in a blended visualization. Many interesting data sets can only be combined at a fine granularity, yet effective visualization techniques require presenting coarse, visually comprehensible quantities of information through effective use of aggregation and filtering. Additionally, users must be able to combine and filter data sets for any data set involved. Disclosed implementations provide a rich data model that supports cleaning and shaping data as well as imposing contiguous structure on non-uniform data. As described above, disclosed implementations perform many operations automatically for users, allowing them to avoid manual intervention unless necessary.

Disclosed implementations enable blending between two data sources without the shared fields in the level of detail of the data visualization. A join level of detail (corresponding to the second set of fields in step 726 of the process flow diagram 700) is not necessarily the same as the level of detail for the overall data visualization (which corresponds to the first set of fields in step 724 of the process flow diagram 700). Data blending happens at the join level of detail but the results are then rolled up to the visualization level of detail before being incorporated in the visualization result set.

Disclosed implementations also enabling blending between a primary data source that is a data cube and a secondary data source from a relational database. As illustrated in FIG. 5, non-aggregate filters are supported for any secondary dimension.

In some implementations, the overall blending process constructs a mapping table for each data source that indicates the relationship between the join level of detail fields and the visualization level of detail fields. For each data source, the mapping table contains the local join level of detail fields and the non-local visualization level of detail fields. In querying each data source, implementations use this mapping table to roll-up the results to the visualization level of detail. For each data source, the query module 226 evaluates the base query, joins in the mapping table, and aggregates at the visualization level of detail. Each data source's query results can then be joined on the visualization level of detail fields to produce the visualization data set 604.

In some implementations, to accommodate secondary filters, mapping tables are extended with a "keep" field that indicates whether or not the individual rows in the mapping table should be present in the final query result. In some implementations, filters on the primary data source flow to secondary data sources to filter the results (e.g., when combining all of the individual data sets using a left outer join). In other implementations, a secondary dimension filter is applied directly to each secondary data source. However, the filtering does not result in a NULL when using left join semantics for blending. If the "keep" field for a given row is false, then the row is not included in final results due to the left join.

The linking field(s) between two data sources need not be in the data visualization. The user interface creates explicit include and exclude lists in the visual specification 602. To determine the actual set of linking fields in some implementations use the combination of the default linking fields and these explicit lists to construct the join specification.

In some implementations, blending and roll-up are based on creating a mapping table that represents the relationship between the join level of detail fields and the data visualization level of detail fields. As each data source is queried, these mapping tables are joined in to relate the query results from the join level of detail to the data visualization level of detail. A mapping table is a basic structure that can be referenced in abstract queries. If a data source supports remote tables, the mapping table is transmitted to the remote data source, thus enabling remote roll-up. If not, the remote data source is queried and the join and roll-up are performed locally at the client device 102.

In some implementations, blending two or more data sources includes the following steps:

Determine the join level of detail and data visualization level of detail from the visual specification.

Query the primary data source for the join and data visualization level of detail fields. Construct an initial mapping table for the primary data source.

Densify the results if needed (e.g., to expand the domain of a continuous dimension such as time to produce a dense domain with no gaps).

Update the primary mapping table using the results of densification.

For each secondary data source, query for the join and data visualization level of detail fields. Combine this information with the primary mapping table and the other secondary mapping tables to create a full mapping table. (Note that this mapping table will be NULL-filled.)

As a performance improvement, some implementations add a unique sequence id for each row in the full mapping table. Then, when secondary filters are applied, the data visualization application simply constructs a table that consists of <unique sequence id, keep> that can be distributed remotely, instead of redistributing the entire table with the updated keep field.

Construct modified mapping tables for each data source by applying the secondary filters. A "keep" field is included in each mapping table that indicates whether or not the field should be included in the query results.

Evaluate the query against the primary data source, applying the modified mapping table. If locally evaluated, evaluate the original query against the remote data source. Join the results with the mapping table, honoring the keep field and rolling-up to the data visualization level of detail. Because there is double aggregation in some instances, additional fields may be added to the query to enable correct calculation of the aggregations for non-additive aggregates. If remotely evaluated, distribute the mapping table to the remote data source and modify the query so that it joins in the mapping table and aggregates up to the data visualization level of detail.

For each secondary data source, do the same operations as performed for the primary data source.

Join the results of the queries against all of the data sources using the data visualization level of detail fields. Strip out join level of detail fields that are not in the data visualization level of detail.

Display the data visualization using the final joined results.

In some implementations, utilizing a mapping table includes these steps:

Determine the mapping between the join level of detail and the data visualization level of detail. For each data source, build a table with all of the dimensions found in the join level of detail and the data visualization level of detail. Join the two tables on the join level of detail fields. Eliminate duplicate entries. Ignoring filters, this is the mapping table between the two data sources. In creating this mapping table, non-aggregate filters can be applied to eliminate unnecessary mappings. Because of the final left outer join, filters applied to the primary data source affect all secondary data sources. Non-aggregate secondary filters can be applied to a secondary data source.

Create a mapping table from the results of the join. Store the mapping table at each data source as a temporary table when possible. A separate mapping table may be produced for each data source. The mapping table may, either implicitly or explicitly, contain a "keep" field based on the semantics of secondary filters. If no field exists, then the implied behavior is "keep=true".

Use the mapping table to join against each data source, computing results needed for the data visualization. When the mapping table was stored at the data source, calculate the aggregates at the data source, and just return the data visualization results from the data source. If not, retrieve enough data from the data source to perform the join and calculate aggregates locally and the client device.

If necessary, strip out join level of detail fields that are not used by the data visualization.

Some implementations achieve data blending by effectively constructing a mediated schema between the primary and secondary data sources that includes primary data source dimensions (that dictate the mapping between the primary and secondary data sources), as well as primary and secondary dimensions that are not used to join between data sources, and measures.

In some circumstances this is achieved by collocating all of the data sources inside a single database. However, collocation is not always the best answer for quick visual exploration of data. Instead, it is sometimes preferable to perform federated querying of the data sources and combine the results locally.

In this scenario, an abstract query representing the data visualization that a user has requested is presented to a primary mediator. The primary mediator, along with secondary data source mediators (i.e. secondary mediators) are responsible for automatically detecting the common fields between the data sources—the join fields—and decomposing the original query into distinct queries for each data source. Queries against each data source are aggregated, thus reducing the amount of data that needs to be transferred from the data sources, and their results are recombined using the identified join fields.

Some implementations expand blending by introducing two distinct notions of level-of-detail: the join level of detail and the data visualization level of detail. Some implementations allow a user to make this distinction explicit. The join level of detail contains the set of fields that will be used to establish the relationship between two data sources. The data visualization level of detail contains fields from the data sources that dictate how to aggregate the query results that have been gathered from all data sources.

The join level of detail is determined by a combination of automatic schema matching and user interaction, as illustrated in FIG. 8. When a user activates a secondary data source, schema matching is automatically performed to identify the set of fields in the primary and secondary data sources that could potentially be joined together. In some implementations, these candidates for joining are indicated by an icon in the visualization. If the user drags one of these identified fields onto the visualization, it is automatically added to the mediated schema relating the primary and secondary data sources. However, by clicking on a field's linking icon, the user may explicitly include or exclude fields in the join level of detail. Enabling a linking field adds that field automatically to the mediated schema that is being constructed between the data sources.

The visualization level of detail is dictated purely by the fields that are on the data visualization. By adding dimension fields to the visualization, the field is automatically added to the mediated schema that is being constructed.

Secondary dimension fields that are added to the visualization are handled slightly differently than primary dimension fields. In some implementations, secondary dimension fields are evaluated as attribute aggregates. The value of secondary dimension fields is also impacted by the existence of secondary dimension filters.

In some implementations, a primary mediator 610 constructs a single abstract query from the visual specification 602. The primary and secondary mediators 602 and 622 identify the join level of detail, the data visualization level of detail, and any secondary dimension filters. The fields in the join level of detail have corresponding fields in the secondary data source.

In some implementations, a mapping table is constructed using this information. The mapping table represents the relationship between all of the data visualization level of detail fields from all of the data sources. As a result, it combines the results of joining the dimensions from all of the secondary data sources.

In some implementations, the primary data source is queried for all dimensions in the join level of detail and the data visualization level of detail. Each secondary data source is queried for all join level of detail fields and data visualization level of detail fields as well. The secondary data visualization level of detail fields are evaluated using the ATTR function, with the secondary dimension filters for the data source applied. Dimensions from the primary and secondary data source are left joined together using their join level of detail fields, producing a mapping table. For each additional secondary data source, the same steps are repeated, with the secondary dimensions being joined to the results of the previous iteration.

The mapping table contains the relationship between all of the dimension fields in the mediated schema. However, it must also be extended with information necessary to determine correct evaluation of secondary dimension filters. Some implementations allow users to specify filters for secondary dimensions to eliminate secondary rows that should not be included in the aggregated results.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that the terms first, second, and so on may be used herein to distinguish one element from another, and are otherwise not limiting. For example, a first contact could be termed a second contact, and, similarly, a second contact could be termed a first contact, without departing from the scope of the present implementations. The first contact and the second contact are both contacts, but they are not the same contact.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for dynamically combining data from multiple data sources, comprising:
   at a client device having one or more processors and memory storing one or more programs for execution by the one or more processors:
   receiving a visual specification for a data visualization from a user, wherein the data visualization requires data from two or more distinct data sources;
   identifying one of the distinct data sources as a primary data source and identifying the remaining distinct data sources as secondary data sources, wherein the primary data source is independent of the secondary data sources;
   receiving user selection of a first group of one or more dimension fields that specify a primary aggregation for the data visualization, wherein each of the one or more dimension fields is a data field in at least one of the data sources;

in accordance with a determination that one or more first dimension fields in the first group are not data fields in one of the data sources, identifying a second group of one or more dimension fields based on the first group by replacing the one or more first dimension fields in the first group with one or more second dimension fields, wherein the second group specifies an intermediate aggregation for joining data sets that is more granular than the primary aggregation specified by the first group;

for each distinct data source:
generating a respective query based on the visual specification, wherein the respective query specifies aggregation of measure fields based on the second group of one or more dimension fields; and
aggregating data from the respective distinct data source using the respective query to form a respective intermediate data set that is aggregated according to the second group of one or more dimension fields;

forming a single combined data set from the intermediate data sets, including the one or more dimension fields specified in the first group;

aggregating each measure field in the combined data set using the primary aggregation according to the one or more dimension fields specified in the first group, thereby rolling up the combined data set to form a final data set based on the one or more dimension fields from the first group; and displaying a data visualization according to the visual specification using the data from the final data set.

2. The method of claim 1, wherein forming the single combined data set comprises performing an outer join locally at the client device with the retrieved data set from the primary data source as the outer data set with respect to all other data sets.

3. The method of claim 1, wherein the visual specification specifies filtering based on one or more fields in one or more secondary data sources, the method further comprising:
determining whether a computing system hosting the primary data source supports receiving and storing temporary tables collocated with the primary data source;
when the computing system hosting the primary data source supports receiving and storing temporary tables collocated with the primary data source:
creating a mapping table using records from one or more of the secondary data sources and transmitting the mapping table to storage collocated with the primary data source;
wherein retrieving the respective data set from the primary data source includes executing the respective query for the primary data source, which filters data from the primary data source using data from the mapping table not present in the primary data source; and
when the computing system hosting the primary data source does not support receiving and storing temporary tables collocated with the primary data source:
generating the query for the primary data source that does not filter the primary data source based on the one or more fields in the one or more secondary data sources; and
after retrieving the data set from the primary data source, filtering the data set from the primary data source locally at the client device, using a local mapping table generated using records from one or more of the secondary data sources.

4. The method of claim 1, wherein generating the query for the primary data source includes adding one or more linking fields to the query, wherein the linking fields correspond to fields in the secondary data sources and the linking fields are not present in the visual specification.

5. The method of claim 1, wherein identifying the second group of one or more dimension fields comprises matching data fields in the primary data source to data fields in each secondary data source based on field names and data types corresponding to each field in the primary and secondary data sources.

6. The method of claim 1, wherein identifying the second group of one or more dimension fields comprises prompting the user to identify linking fields between the primary data source and each of the secondary data sources when linking fields cannot be determined automatically based on field names and data types.

7. The method of claim 1, wherein the primary data source comprises one or more tables in a relational database.

8. The method of claim 1, wherein the primary data source is a data cube.

9. The method of claim 1, wherein one or more of the data sources are selected from the group consisting of spreadsheets, text files, and CSV files.

10. The method of claim 1, wherein the primary data source is not collocated with any of the secondary data sources.

11. The method of claim 1, wherein the primary data source and secondary data sources are accessed using distinct software applications.

12. A client device, comprising:
one or more processors;
memory; and
one or more programs stored in the memory for execution by the one or more processors, the one or more programs comprising instructions for:
receiving a visual specification for a data visualization from a user, wherein the data visualization requires data from two or more distinct data sources;
identifying one of the distinct data sources as a primary data source and identifying the remaining distinct data sources as secondary data sources, wherein the primary data source is independent of the secondary data sources;
receiving user selection of a first group of one or more dimension fields that specify a primary aggregation for the data visualization, wherein each of the one or more dimension fields is a data field in at least one of the data sources;
in accordance with a determination that one or more first dimension fields in the first group are not data fields in one of the data sources, identifying a second group of one or more dimension fields based on the first group by replacing the one or more first dimension fields in the first group with one or more second dimension fields, wherein the second group specifies an intermediate aggregation for joining data sets that is more granular than the primary aggregation specified by the first group;
for each distinct data source:
generating a respective query based on the visual specification, wherein the respective query specifies aggregation of measure fields based on the second group of one or more dimension fields; and aggregating data from the respective distinct data source using the respective query to form a respective intermediate data set that is aggregated according to the second group of one or more dimension fields;

forming a single combined data set from the intermediate data sets, including the one or more dimension fields specified in the first group;

aggregating each measure field in the combined data set using the primary aggregation according to the one or more dimension fields specified in the first group, thereby rolling up the combined data set to form a final data set based on the one or more dimension fields from the first group; and displaying a data visualization according to the visual specification using the data from the final data set.

13. The client device of claim 12, wherein the instructions for forming the single combined data set further comprise instructions for performing an outer join locally at the client device with the retrieved data set from the primary data source as the outer data set with respect to all other data sets.

14. The client device of claim 12, wherein the visual specification specifies filtering based on one or more fields in one or more secondary data sources, the one or more programs further comprising instructions for:

determining whether a computing system hosting the primary data source supports receiving and storing temporary tables collocated with the primary data source;

when the computing system hosting the primary data source supports receiving and storing temporary tables collocated with the primary data source:
creating a mapping table using records from one or more of the secondary data sources and transmitting the mapping table to storage collocated with the primary data source;
wherein retrieving the respective data set from the primary data source includes executing the respective query for the primary data source, which filters data from the primary data source using data from the mapping table not present in the primary data source; and when the computing system hosting the primary data source does not support receiving and storing temporary tables collocated with the primary data source:
generating the query for the primary data source that does not filter the primary data source based on the one or more fields in the one or more secondary data sources; and
after retrieving the data set from the primary data source, filtering the data set from the primary data source locally at the client device, using a local mapping table generated using records from one or more of the secondary data sources.

15. The client device of claim 12, wherein the instructions for generating the query for the primary data source includes instructions for adding one or more linking fields to the query, wherein the linking fields correspond to fields in the secondary data sources and the linking fields are not present in the visual specification.

16. The client device of claim 12, wherein the instructions for identifying the second group of one or more dimension fields further comprise instructions for matching data fields in the primary data source to data fields in each secondary data source based on field names and data types corresponding to each field in the primary and secondary data sources.

17. The client device of claim 12, wherein the primary data source is not collocated with any of the secondary data sources.

18. The client device of claim 12, wherein the primary data source and secondary data sources are accessed using distinct software applications.

19. A non-transitory computer readable storage medium storing one or more programs configured for execution by a client device having one or more processors and memory storing one or more programs for execution by the one or more processors, the one or more programs comprising instructions for:

receiving a visual specification for a data visualization from a user, wherein the data visualization requires data from two or more distinct data sources;

identifying one of the distinct data sources as a primary data source and identifying the remaining distinct data sources as secondary data sources, wherein the primary data source is independent of the secondary data sources;

receiving user selection of a first group of one or more dimension fields that specify a primary aggregation for the data visualization, wherein each of the one or more dimension fields is a data field in at least one of the data sources;

in accordance with a determination that one or more first dimension fields in the first group are not data fields in one of the data sources, identifying a second group of one or more dimension fields based on the first group by replacing the one or more first dimension fields in the first group with one or more second dimension fields, wherein the second group specifies an intermediate aggregation for joining data sets that is more granular than the primary aggregation specified by the first group;

for each distinct data source:
generating a respective query based on the visual specification, wherein the respective query specifies aggregation of measure fields based on the second group of one or more dimension fields; and
aggregating data from the respective distinct data source using the respective query to form a respective intermediate data set that is aggregated according to the second group of one or more dimension fields;

forming a single combined data set from the intermediate data sets, including the one or more dimension fields specified in the first group;

aggregating each measure field in the combined data set using the primary aggregation according to the one or more dimension fields specified in the first group, thereby rolling up the combined data set to form a final data set based on the one or more dimension fields from the first group; and displaying a data visualization according to the visual specification using the data from the final data set.

20. The non-transitory computer readable storage medium of claim 19, wherein the visual specification specifies filtering based on one or more fields in one or more secondary data sources, the one or more programs further comprising instructions for:

determining whether a computing system hosting the primary data source supports receiving and storing temporary tables collocated with the primary data source;

when the computing system hosting the primary data source supports receiving and storing temporary tables collocated with the primary data source:
  creating a mapping table using records from one or more of the secondary data sources and transmitting the mapping table to storage collocated with the primary data source;
  wherein retrieving the respective data set from the primary data source includes executing the respective query for the primary data source, which filters data from the primary data source using data from the mapping table not present in the primary data source; and
when the computing system hosting the primary data source does not support receiving and storing temporary tables collocated with the primary data source:
  generating the query for the primary data source that does not filter the primary data source based on the one or more fields in the one or more secondary data sources; and
  after retrieving the data set from the primary data source, filtering the data set from the primary data source locally at the client device, using a local mapping table generated using records from one or more of the secondary data sources.

* * * * *